US008604143B2

(12) United States Patent
Wang et al.

(10) Patent No.: US 8,604,143 B2
(45) Date of Patent: Dec. 10, 2013

(54) CATALYSTS FOR POLYMERIZATION OF ISOPRENE AND PREPARATIONS AND USES THEREOF

(75) Inventors: Chao Wang, Beijing (CN); Chuanqing Li, Beijing (CN); Guozhu Yu, Beijing (CN); Aimin Liang, Beijing (CN); Jie Zhang, Beijing (CN); Lin Xu, Beijing (CN); Pengfei Lv, Beijing (CN); Huiling Liu, Beijing (CN)

(73) Assignees: China Petroleum & Chemical Corporation, Beijing (CN); Sinopec Beijing Research Institute of Chemical Industry, Beijing (CN)

( * ) Notice: Subject to any disclaimer, the term of this patent is extended or adjusted under 35 U.S.C. 154(b) by 0 days.

(21) Appl. No.: 13/284,744

(22) Filed: Oct. 28, 2011

(65) Prior Publication Data
US 2012/0108773 A1    May 3, 2012

(30) Foreign Application Priority Data

Oct. 28, 2010 (CN) .......................... 2010 1 0530011
Oct. 28, 2010 (CN) .......................... 2010 1 0530018

(51) Int. Cl.
C08F 4/44     (2006.01)
C08F 4/02     (2006.01)
C08F 4/60     (2006.01)
B01J 31/00    (2006.01)
B01J 37/00    (2006.01)

(52) U.S. Cl.
USPC ........ 526/124.3; 526/142; 502/126; 502/104; 502/107

(58) Field of Classification Search
USPC ................ 526/124.3, 142; 502/126, 104, 107
See application file for complete search history.

(56) References Cited

U.S. PATENT DOCUMENTS

| 3,594,330 | A  | * | 7/1971 | Delbouille | ..................... 502/104 |
| 3,687,925 | A  |   | 8/1972 | Fukui      |                               |
| 7,741,418 | B2 | * | 6/2010 | Luo et al. | ..................... 526/142 |
| 2010/0168350 | A1 | | 7/2010 | Brita et al. |                             |

FOREIGN PATENT DOCUMENTS

| CN | 101220107  | 7/2008  |
| CN | 101389663  | 3/2009  |
| EP | 0 361 493  | 4/1990  |
| GB | 1150535    | 4/1969  |
| JP | 52-152487  | 12/1977 |
| JP | 54-3186    | 1/1979  |
| JP | 57-123204  | 7/1982  |
| SU | 1452809    | 1/1989  |

OTHER PUBLICATIONS

W.R. Kirner, "Alphas-tetrahydrofurfuryl chloride and alpha-tetrahydrofurfuryl ethers," Journal of American Chemical Society, 52, pp. 3251-3256 (1930).
S. Wang et al., "Preparation of isoprene rubber with titanium catalyst modified by diphenyl ether," China Synthetic Rubber Industry, 30(1), pp. 22-25 (Jan. 15, 2008).
W. L. Hsu et al., "Novel ether modifiers for anionic polymerization of isoprene," Rubber Chemistry & Technology, 71(1), pp. 62-69 (1998).
W. L. Hsu et al., Rubber World, 28(10), pp. 20-24 (1998).

* cited by examiner

*Primary Examiner* — Ling Choi
*Assistant Examiner* — Catherine S Branch
(74) *Attorney, Agent, or Firm* — Finnegan, Henderson, Farabow, Garrett & Dunner LLP

(57) ABSTRACT

Disclosed are catalyst compositions for isoprene polymerization formed from components comprising (A) at least one titanium halide; (B) at least one organic aluminum compound comprising at least one alkyl aluminum of formula $AlR_3$, wherein each of the three Rs is independently chosen from linear and branched $C_{1-6}$ alkyl groups; and (C) at least one electron donor comprising at least one polyether compound of formula (I) and/or at least one tetrahydro-furfuryl ether compound of formula (II). Also disclosed are processes for preparation of the catalyst compositions and processes using the catalyst compositions for isoprene polymerization.

16 Claims, No Drawings

CATALYSTS FOR POLYMERIZATION OF ISOPRENE AND PREPARATIONS AND USES THEREOF

This application claims priority under 35 U.S.C. §119 to Chinese Application Nos. 201010530011.2 and 201010530018.4, both of which were filed on Oct. 28, 2010.

The present disclosure relates to catalysts for polymerization of isoprene, such as a titanium-based heterogeneous catalyst composition for isoprene polymerization, such as homo-polymerization of isoprene, and the preparations and uses thereof.

The polymerization of isoprene monomers may result in different structures of polyisoprene, including, for example, cis-1,4-polyisoprene, trans-1,4-polyisoprene, 3,4-polyisoprene, and 1,2-polyisoprene, wherein cis-1,4-polyisoprene is generally referred to as isoprene rubber or "IR." The microstructure of IR is similar to that of natural rubbers (for example, the Hevea rubber and the guayule rubber), and for this reason, IR is also referred to as synthetic natural rubber. IR has been widely used in producing tires and other rubber products, and has replaced the natural rubber in most cases. Roughly over 70-75% of IR produced worldwide or over more than 90% of IR produced in the Middle and East Europe have been used for the production of tires or rubber products. Further, IR is also used in producing mechanical products, shoes, erasers, hoses, adhesive belts, sports articles, adhesives, sealants etc. In the 70s of the last century, the consumption of IR was the third highest among the general purpose synthetic rubbers, which was ranked only after butadiene-styrene rubbers and cis-butadiene rubbers.

Based on the type of the catalysts used during the preparation, IR can be classified as a Li-based isoprene rubber (Li-IR), a titanium-based isoprene rubber (Ti-IR), and a rare earth-based isoprene rubber (Nd-IR).

The Li-based isoprene rubber (Li-IR) is a tactic elastomer produced by polymerization of isoprene monomer in the presence of an alkyl lithium initiator and an anion solution. Compared to the titanium-based isoprene rubber, the Li-based isoprene rubber boasts higher molecular weight and narrower molecular weight distribution, and contains nearly no gel. However, the Li-based isoprene rubber has lower cis-content (91-92%) and exhibits inferior comprehensive performance if compared with the titanium-based isoprene rubber. Further, the Li-based catalyst is rather sensitive to impurities, such as oxygen-, sulfur-, or nitrogen-containing compounds, and therefore may lay too much strict requirement on the starting materials.

Both of the titanium-based isoprene rubber and the rare earth-based isoprene rubber may have a cis-1,4-structure content of 95 mol % or more. A polymer can have properties more similar to those of a natural rubber in performance; exhibit consistent product quality and higher product purity; become easier for softening, blending, and mixing; and have a shorten plastication time, lower expansion and shrinkage, and better performance in extruding and calendering, when it has a higher content of cis-structure. Accordingly, increasing the content of cis-1,4-structure in IR has been identified as an important direction in improving the properties of the synthetic IR.

There are many types of titanium-based Ziegler-Natta catalyst that can be used for synthesizing cis-1,4-polyisoprene. Two types of the catalysts, i.e. one based on $TiCl_4$—$AlR_3$ and the other one based on $TiCl_4$-polyimino aluminum alkyl, have been widely used in the industrial scale production.

For example, in the former Soviet Union, U.S., and Japan, $TiCl_4$—$AlR_3$ initiating system has been used for producing IR. Examples of $AlR_3$ may include $(C_2H_5)_3Al$, $(C_3H_7)_3Al$, $(i-C_4H_9)_3Al$ and $(C_6H_5)_3Al$ and the like, and wherein $(i-C_4H_9)_3Al$ is mostly used in the industry. The molar ratio of Al/Ti usually ranges, for example, from 0.9:1 to 1.0:1, which may give the highest initiator activity and cis-1,4-structure content in the polymer. To improve the activity of the $TiCl_4$—$AlR_3$ initiating system and the quality of the polymer, various electron donors such as ethers (for example, aliphatic ethers and aromatic ethers), amines (for example, aliphatic amines, aromatic amines and other amines), or a mixture thereof, have been added to the system as a third component. The addition of the third component may produce certain synergistic effects. For example, when a $TiCl_4$—$AlR_3$—$CS_2$ system is used instead of $TiCl_4$—$AlR_3$, the yield of the polymer can be increased and the production of oligomers can be decreased; and when a $TiCl_4$—$AlR_3$-diphenyl ether system is used, the polymerization temperature can be increased and the tolerability of the initiating system to trace moisture can be improved as well.

In a $TiCl_4$/alkyl aluminum/ether based catalyst, the type and the amount of the ether electron donor (as the third component) may significantly affect the activity of the catalyst and the structure and properties of the resultant polymer. See e.g., U.S. Pat. No. 3,687,925, Japanese Patent Application No. JP57-123204A.

The composition of the catalyst and the conditions under which the catalyst is produced may also affect the activity of the catalyst and the structure of the polymer produced. See e.g., United Kingdom Patent No. GB1,150,535, U.S.S.R. Patent No. SU1452809A1, Japanese Patent Application No. JP52-152487A, and Japanese Patent Application No. JP54-3186A.

Currently, there still exists a need for further optimizing the process for preparing the catalyst, developing a new catalyst for isoprene polymerization, and improving the activity of the catalyst and the properties of the polymer produced.

Upon extensive research, the present inventors have developed a new titanium-based heterogeneous catalyst composition for isoprene polymerization (also referred to as "the catalyst composition" hereinafter). The catalyst composition disclosed herein may be produced by a simple and easily controllable process, and may be characterized by its heterogeneous nature and its high activity, stereoregularity, and stability. In addition, by using the titanium-based heterogeneous catalyst composition for isoprene polymerization according to the present disclosure, polyisoprene having a cis-1,4-structure content of more than 99 mol %, a weight averaged molecular weight varying in the range from 1,000,000 to 3,000,000, and a molecular weight distribution ranging from 3.0 to 4.0 may be obtained by a stable and easily controllable polymerization process, which is suitable for continuous operation. Moreover, by using the titanium-based heterogeneous catalyst composition for isoprene polymerization according to the present disclosure, polyisoprene having a cis-1,4-structure content of more than 99 mol %, a Mooney viscosity ML(1+4) at 100° C. varying in the range from 60 to 90, and a much higher tensile strength can be obtained.

Thus, provided herein are titanium-based heterogeneous catalyst compositions for isoprene polymerization. Also provided herein are processes for producing the titanium-based heterogeneous catalyst composition for isoprene polymerization.

Further provided herein are processes for isoprene polymerization such as homo-polymerization of isoprene comprising the use of the titanium-based heterogeneous catalyst composition.

Still provided herein are processes for isoprene polymerization comprising using at least one ether-based compound in the production of a titanium-based heterogeneous catalyst composition.

Disclosed herein are titanium-based heterogeneous catalyst compositions for isoprene polymerization formed from components comprising:
- (A) at least one titanium halide;
- (B) at least one organic aluminum compound comprising at least one alkyl aluminum of a general formula $AlR_3$, wherein each of the three Rs is independently (i.e., may be identical to or different from one another, such as identical to each other (i.e., the three Rs are the same)) chosen from linear and branched $C_{1-6}$ alkyl groups; and
- (C) at least one electron donor comprising at least one polyether compound of formula (I) and/or at least one tetrahydro-furfuryl ether compound of formula (II), $$R^0O(R^1O)_pR^2 \quad (I),$$

wherein $R^0$ and $R^2$ are independently chosen from linear and branched $C_{1-6}$ alkyl groups;
$R^1$ is —$(CR^3R^4$—$CR^5R^6)$—, wherein $R^3$, $R^4$, $R^5$ and $R^6$ are independently chosen from hydrogen and linear and branched $C_{1-4}$ alkyl groups, and p is an integer ranging from 1 to 6,

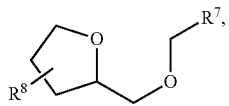

(II)

wherein $R^7$ is chosen from linear and branched $C_{1-10}$ alkyl groups and aryl groups, such as $C_{6-20}$ aryl groups; $R^8$, representing at least one substituent on the tetrahydro-furfuryl moiety, is independently chosen from hydrogen and linear and branched $C_{1-4}$ alkyl groups.

In some embodiments, the at least one titanium halide (i.e., component (A)) is $TiCl_4$.

In some embodiments, the at least one organic aluminum compound ((i.e., component (B)) is the at least one alkyl aluminum of the formula $AlR_3$.

In some embodiments, the at least one alkyl aluminum is chosen from tri-methyl aluminum, tri-ethyl aluminum, tri-propyl aluminum, tri-butyl aluminum, tri-pentyl aluminum, and tri-hexyl aluminum.

In some embodiments, the at least one electron donor (i.e., component (C)) is the at least one polyether compound of the formula (I) and/or the at least one tetrahydro-furfuryl ether compound of the formula (II).

In some embodiments, the at least one tetrahydro-furfuryl ether compound is chosen from methyl tetrahydro-furfuryl ether, ethyl tetrahydro-furfuryl ether, n-propyl tetrahydro-furfuryl ether, iso-propyl tetrahydro-furfuryl ether, butyl tetrahydro-furfuryl ether, pentyl tetrahydro-furfuryl ether, hexyl tetrahydro-furfuryl ether, heptyl tetrahydro-furfuryl ether, octyl tetrahydro-furfuryl ether, and phenyl tetrahydro-furfuryl ether, and the at least one polyether compound is chosen from ethylene glycol dimethyl ether, diethylene glycol dimethyl ether, triethylene glycol dimethyl ether, and tetraethylene glycol dimethyl ether.

In some embodiments, the molar ratio of the at least one organic aluminum compound (component (B)) to the at least one titanium halide (component (A)) ranges from 0.01:1 to 10:1, and the molar ratio of the at least one electron donor (component (C)) to the at least one organic aluminum compound (component (B)) ranges from 0.001:1 to 10:1.

In some embodiments, the titanium-based heterogeneous catalyst composition for isoprene polymerization is presented in a form of a reaction product.

Also provided herein are processes for producing a titanium-based heterogeneous catalyst composition for isoprene polymerization comprising:
1) preparing a mixture comprising at least one organic aluminum compound (B) and at least one electron donor (C) under an inert gas atmosphere,
2) mixing the mixture with at least one titanium halide (A) to obtain a slurry, and
3) optionally ageing the slurry; wherein:
the at least one organic aluminum compound (B) comprises at least one alkyl aluminum of formula $AlR_3$, wherein each of the three Rs is independently chosen from linear and branched $C_{1-6}$ alkyl groups; and
the at least one electron donor (C) comprises at least one polyether compound of formula (I) and/or at least one tetrahydro-furfuryl ether compound of formula (II), $$R^0O(R^1O)_pR^2 \quad (I),$$

wherein $R^0$ and $R^2$ are independently chosen from linear and branched $C_{1-6}$ alkyl groups;
$R^1$ is —$(CR^3R^4$—$CR^5R^6)$—, wherein $R^3$, $R^4$, $R^5$ and $R^6$ are independently chosen from hydrogen and linear and branched $C_{1-4}$ alkyl groups, and p is chosen from integers ranging from 1 to 6,

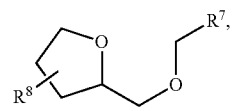

(II)

wherein $R^7$ is chosen from linear and branched $C_{1-10}$ alkyl groups and aryl groups, such as $C_{6-20}$ aryl groups; $R^8$, representing at least one substituent on the tetrahydro-furfuryl moiety, is independently chosen from hydrogen and linear and branched $C_{1-4}$ alkyl groups.

In some embodiments, the step 1) and the step 2) are conducted at a temperature ranging from −70° C. to −10° C., and the step 3) is conducted at a temperature ranging from −60° C. to 100° C.

In some embodiments, the step 2) is conducted for a time period ranging from 20 minutes to 60 minutes, and the step 3) is conducted for a time period ranging from 0.5 hours to 24 hours.

Also provided herein are processes for polymerizing isoprene, comprising using the titanium-based heterogeneous catalyst composition for isoprene polymerization as at least one part of the catalyst used for the polymerization or as the only catalyst for the polymerization.

In some embodiments, the process for polymerizing isoprene comprises reacting isoprene with the titanium-based heterogeneous catalyst composition disclosed herein.

In some embodiments, the process for polymerizing isoprene comprising: 1) preparing a titanium-based heterogeneous catalyst composition according to the processes disclosed herein, and 2) polymerizing isoprene by using the prepared catalyst composition as at least one part of the catalyst or as the only catalyst for the polymerization.

Also provided herein are the processes for preparing a catalyst composition for isoprene polymerization comprising using at least one polyether compound of formula (I) and/or at least one tetrahydro-furfuryl ether compound of formula (II) as at least one part of the electron donor or as the only electron donor,

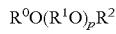  (I), wherein $R^0$ and $R^2$ are independently chosen from linear and branched $C_{1-6}$ alkyl groups;

$R^1$ is —$(CR^3R^4$—$CR^5R^6)$—, wherein $R^3$, $R^4$, $R^5$ and $R^6$ are independently chosen from hydrogen and linear and branched $C_{1-4}$ alkyl groups, and p is an integer ranging from 1 to 6,

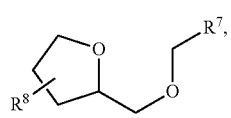

wherein $R^7$ is chosen from linear and branched $C_{1-10}$ alkyl groups and aryl groups, such as $C_{6-20}$ aryl groups; $R^8$, representing at least one substituent on the tetrahydro-furfuryl moiety, is independently chosen from hydrogen and linear and branched $C_{1-4}$ alkyl groups.

Also provided herein are the processes for isoprene polymerization comprising: (1) using at least one polyether compound of formula (I) and/or at least one tetrahydro-furfuryl ether compound of formula (II) as set forth above as at least one part of the electron donor or as the only electron donor to prepare a catalyst composition, and 2) polymerizing isoprene by using the prepared catalyst composition as at least one part of the catalyst or the only catalyst for polymerization,

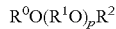  (I), wherein $R^0$ and $R^2$ are independently chosen from linear and branched $C_{1-6}$ alkyl groups;

$R^1$ is —$(CR^3R^4$—$CR^5R^6)$—, wherein $R^3$, $R^4$, $R^5$ and $R^6$ are independently chosen from hydrogen and linear and branched $C_{1-4}$ alkyl groups, and p is an integer ranging from 1 to 6,

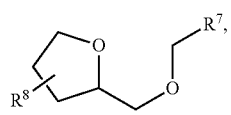

wherein $R^7$ is chosen from linear and branched $C_{1-10}$ alkyl groups and aryl groups, such as $C_{6-20}$ aryl groups; $R^8$, representing at least one substituent on the tetrahydro-furfuryl moiety, is independently chosen from hydrogen and linear and branched $C_{1-4}$ alkyl groups.

In some embodiments, the at least one tetrahydro-furfuryl ether compound is chosen from methyl tetrahydro-furfuryl ether, ethyl tetrahydro-furfuryl ether, n-propyl tetrahydro-furfuryl ether, iso-propyl tetrahydro-furfuryl ether, butyl tetrahydro-furfuryl ether, pentyl tetrahydro-furfuryl ether, hexyl tetrahydro-furfuryl ether, heptyl tetrahydro-furfuryl ether, octyl tetrahydro-furfuryl ether, and phenyl tetrahydro-furfuryl ether; and the at least one polyether compound is chosen from ethylene glycol dimethyl ether, diethylene glycol dimethyl ether, triethylene glycol dimethyl ether, and tetraethylene glycol dimethyl ether.

In the present disclosure, unless otherwise expressively indicated, any numeral value herein can be deemed as having been prefixed by "about".

As noted above, disclosed herein are titanium-based heterogeneous catalyst compositions for isoprene polymerization formed from components comprising:
(A) at least one titanium halide;
(B) at least one organic aluminum compound comprising at least one alkyl aluminum of a general formula $AlR_3$, wherein each of the three Rs is independently (i.e., may be identical to or different from one another, such as identical to each other (the three Rs are the same)) chosen from linear and branched $C_{1-6}$ alkyl groups; and
(C) at least one electron donor comprising at least one polyether compound of formula (I) and/or at least one tetrahydro-furfuryl ether compound of formula (II),

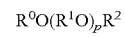  (I), wherein $R^0$ and $R^2$ are independently chosen from linear and branched $C_{1-6}$ alkyl groups;

$R^1$ is —$(CR^3R^4$—$CR^5R^6)$—, wherein $R^3$, $R^4$, $R^5$ and $R^6$ are independently chosen from hydrogen and linear and branched $C_{1-4}$ alkyl groups, and p is an integer ranging from 1 to 6,

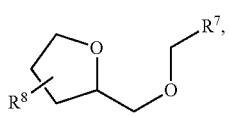

wherein $R^7$ is chosen from linear and branched $C_{1-10}$ alkyl groups and aryl groups, such as $C_{6-20}$ aryl groups; $R^8$, representing at least one substituent on the tetrahydro-furfuryl moiety, is independently chosen from hydrogen and linear and branched $C_{1-4}$ alkyl groups.

In some embodiments, the titanium-based heterogeneous catalyst composition for isoprene polymerization disclosed herein is formed from components comprising:
(A) at least one titanium halide;
(B) at least one organic aluminum compound comprising at least one alkyl aluminum of a general formula $AlR_3$, wherein each of the three Rs is independently (i.e., may be identical to or different from one another, such as identical to each other (the three Rs are the same)) chosen from linear and branched $C_{1-6}$ alkyl groups; and
(C) at least one electron donor comprising at least one polyether compound of formula (I),

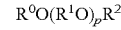  (I), wherein $R^0$ and $R^2$ are independently chosen from linear and branched $C_{1-6}$ alkyl groups;

$R^1$ is —$(CR^3R^4$—$CR^5R^6)$—, wherein $R^3$, $R^4$, $R^5$ and $R^6$ are independently chosen from hydrogen and linear and branched $C_{1-4}$ alkyl groups, and p is an integer ranging from 1 to 6.

In some embodiments, the titanium-based heterogeneous catalyst composition for isoprene polymerization disclosed herein may further comprise at least one nonreactive component known in this field, for instance, at least one nonreactive component that may provide desirable properties (e.g., ease of handling) to the composition, as long as the introduction or presence of the nonreactive component will not compromise, for example, the performance and the self-support nature (i.e. free form or non-supported state) of the present catalyst composition.

In one embodiment, the at least one nonreactive component that may be added to the catalyst composition may not react chemically with any of the three components or with the reaction product. In one embodiment, the at least one nonreactive component is chosen from inert solvents, inert diluents, and inert dispersing media.

In some embodiments, the titanium-based heterogeneous catalyst composition for isoprene polymerization is present in a non-supported form or in a free form. Thus, components such as carriers, supports, or solid catalyst components (for example, silica or magnesium halide) that (1) may affect the self-support nature and/or the micro-structure of the present catalyst composition or (2) may convert the present catalyst composition into a supported catalyst may be excluded.

In some embodiments, the titanium-based heterogeneous catalyst composition for isoprene polymerization disclosed herein is the reaction product of the components (A), (B), and (C). In further some embodiments, the catalyst composition disclosed herein may further comprise at least one inert component chosen, for example, from inert solvents and inert dispersing media. The at least one inert component disclosed herein may be (1) introduced during the chemical reaction of the three components for dissolution or dispersion of any of the three components so as to facilitate the chemical reaction therebetween; or (2) further added after the completion of the preparation of the catalyst composition so as to disperse the catalyst composition therein, which may facilitate the use of the catalyst composition.

In some embodiments, the at least one inert component may be chosen from saturated aliphatic hydrocarbons, cycloaliphatic hydrocarbons, and aromatic hydrocarbons, for example, chosen from $C_{5-10}$ alkanes and cycloalkanes such as hexane, cyclohexane, heptane, octane, toluene, benzene, and any mixture thereof, further such as chosen from toluene and hexane.

In some embodiments, the catalyst composition is obtained by reacting the three components, i.e., the components (A), (B), and (C) in a chemical reaction, and no other additional reactant is added. However, inert solvents and/or catalysts necessary for the chemical reaction may be included.

In some embodiments, the at least one titanium halide (component (A)) is chosen, for example, from $TiCl_3$ and $TiCl_4$ such as $TiCl_4$, which supplies the metal catalytic active center (Ti) for the catalyst composition disclosed herein. In one embodiment, the component (A) or the catalyst composition disclosed herein may contain no metal element (for example, V, Co, Cr, Zr, Hf, etc.) other than Ti as the metal catalytic active center of the catalyst composition. In that case, the catalyst composition disclosed herein is a single-metal (or mono-metal) catalytic active center type.

In some embodiments, the at least one organic aluminum compound (component (B)) comprises the at least one alkyl aluminum of a general formula $AlR_3$. In one embodiment, the at least one alkyl aluminum is chosen from tri-methyl aluminum, tri-ethyl aluminum, tri-propyl aluminum, tri-butyl aluminum, tri-pentyl aluminum, and tri-hexyl aluminum. For example, the at least one alkyl aluminum is tri-butyl aluminum or tri-isobutyl aluminum. In another embodiment, the at least one organic aluminum compound may further comprise at least one organic aluminum compound chosen from those commonly used in this field as a co-catalyst component, such as, aluminoxane and haloalkyl aluminum.

In some embodiments, the at least one organic aluminum compound may comprise only one or two or more types of alkyl aluminum of the formula $AlR_3$.

In some embodiments, the at least one alkyl aluminum of the formula $AlR_3$ is present in the component (B) in an amount of equal to or great than 80 mol %, such as equal to or greater than 90 mol %, further such as equal to or greater than 95 mol %, or even further such equal to greater than 98 mol %, also even further such as equal to greater than 99 mol % relative to the total molar of the component (B). In one embodiment, the component (B) comprises only the at least one alkyl aluminum (i.e., 100 mol %).

In some embodiments, the at least one electron donor (component (C)) comprises the at least one polyether compound of formula (I) and may further comprise at least one additional electron donor other than the at least one polyether compound, chosen, for example, from different ether compounds such as n-butyl ether or diphenyl ether, amines, and esters. In addition, the at least one tetrahydro furfuryl ether compound of formula (II) may be further included in the component (C).

In some embodiments, the at least one polyether compound is present in the component (C) in an amount of equal to or great than 80 mol %, such as equal to or great than 90 mol %, further such as equal to or great than 95 mol %, even further such as equal to or great than 98 mol %, and also further such as equal to or great than 99 mol %, relative to the total molar of the component (C). In one embodiment, the component C) comprises only the at least one polyether compound (i.e., 100 mol %).

In some embodiments, $R^0$ and $R^2$ in the at least one polyether compound of formula (I) is —$CH_3$, $R^1$ is —$(CH_2CH_2)$—, and p is an integer ranging from 1 to 4. In one embodiment, the at least one polyether compound of formula (I) is chosen from ethylene glycol dimethyl ether, diethylene glycol dimethyl ether, triethylene glycol dimethyl ether, and tetraethylene glycol dimethyl ether.

In some embodiments, the component (C) may comprise only one or two or more types of polyether compounds.

In some embodiments, the ratio between the components may vary in a wide range, for example, the molar ratio of the component (B) to the component (A) (B:A) may range from 0.01:1 to 10:1, such as from 0.1:1 to 5:1, further such as from 0.8:1 to 1.2:1; and the molar ratio of the component (C) to the component (B) (C:B) may range from 0.001:1 to 20:1, such as from 0.001:1 to 10:1, further such as from 0.01:1 to 1:1. In one embodiment, the molar ratio of the components (A), (B), and (C) (A:B:C) ranges from 1:0.01:0.001 to 1:10:20 (i.e., A:B:C=1: (0.01-10):(0.001-20)), such as from 1:0.1:0.001 to 1:5:10 (i.e., A:B:C=1:(0.1-5):(0.001-10)), further such as from 1:0.8:0.01 to 1:1.2:1 (i.e., A:B:C=1:(0.8-1.2):(0.01-1)).

In some embodiments, the titanium-based heterogeneous catalyst composition disclosed herein is produced by a process comprising:
1) preparing a mixture comprising the components (B) and (C) (for example, by stirring and/or in the presence of at least one organic solvent) under the protection of an inert gas atmosphere (for example, nitrogen gas, a rare gas, and the like), and
2) mixing the mixture with the component (A) for a period of time (if needed, under stirring) to obtain a slurry.

In some embodiments, the process for preparing the titanium-based heterogeneous catalyst composition may optionally comprise a step 3) aging the slurry obtained from the step 2), which may further allow the resultant catalyst composition to sufficiently exhibit its catalyst activity.

In some embodiments, the slurry obtained from the step 2) or the aged slurry obtained from the step 3) may be used directly as the titanium-based heterogeneous catalyst composition for isoprene polymerization. In some other embodiments, the composition obtained by removing any organic solvent and/or any impurities (for example, byproduct or un-reacted reactant) from the slurry or from the aged slurry, and/or the composition obtained by further introducing the at least one nonreactive component as aforesaid into the slurry or into the aged slurry may all be used as the titanium-based heterogeneous catalyst composition for isoprene polymerization.

In some embodiments, the process for preparing the catalyst composition may be conducted in the presence of at least one organic solvent, chosen, for example, from saturated aliphatic hydrocarbons, cycloaliphatic hydrocarbons, and aromatic hydrocarbons, known in this field to have appropriate solubility but no chemical reactivity to the three components (A), (B), and (C). For instance, the at least one organic solvent is chosen from $C_{5-10}$ alkanes and cycloalkanes, such as hexane, cyclohexane, heptane, octane, benzene, and toluene. In one embodiment, the at least one organic solvent is chosen from toluene and hexane.

When at least one organic solvent is used, the step 1) may be conducted by, for example, simultaneously contacting the components (B) and (C) in the organic solvent, mixing a solution of the component (B) in the organic solvent with a solution of the component (C) in the organic solvent, mixing the component (B) with a solution of the component (C) in the organic solvent, or mixing a solution of the component (B) in the organic solvent with the component C), so as to obtain the mixture.

In the step 2), the resultant mixture of step (1) may be mixed (if needed, under stirring) with the component (A) or a solution of the component (A) in the organic solvent (if used), for example, by adding the mixture thereto within a period of time, thereby obtaining the slurry.

In some embodiments, the organic solvents used in each of the steps for dissolving the components (so as to obtain a corresponding solution in the organic solvent) may be identical to or different from one another, and independently of one another, may be chosen from the aforesaid organic solvents. In one embodiment, the same organic solvent may be used for all of the steps.

In some embodiments, there may be no limitation on the time duration for which the step a) is conducted, while the step b) may be conducted for a period of time ranging from 10 minutes to 120 minutes, such as from 20 minutes to 60 minutes. In some embodiments, the step a) and the step b) are conducted at a temperature ranging from −70° C. to −10° C., such as from −60° C. to −10° C., further such as from −50° C. to −20° C.

In some embodiments, the process disclosed herein comprises conducting the step (3), (i.e., aging the slurry) at a temperature ranging from −60° C. to 100° C., such as from −30° C. to 30° C., further such as from −30° C. to −10° C. The time period for the aging may range, for example, from 0.5 hours to 48 hours, such as from 0.5 hours to 24 hours, further such as from 1 hour to 12 hours.

The titanium-based heterogeneous catalyst composition disclosed herein is suitable for polymerization of isoprene, such as homo-polymerization of isoprene.

In some embodiments, for the polymerization of isoprene, the catalyst composition disclosed herein may be used in an amount varying over a wide range in the polymerization of isoprene. For example, with respect to isoprene (IP), based on the titanium atom as the metal catalytic active center, the catalyst composition disclosed herein may be used in an amount ranging from $0.1 \times 10^{-4}$ mol Ti/mol IP to $2.5 \times 10^{-4}$ mol Ti/mol IP, such as from $0.2 \times 10^{-4}$ mol Ti/mol IP to $2 \times 10^{-4}$ mol Ti/mol IP.

In some embodiments, the polymerization is conducted by a solution polymerization process in at least one inert hydrocarbon solvent. The at least one inert hydrocarbon solvent may be chosen, for example, from $C_{5-10}$ alkanes and cycloalkanes, such as hexane, cyclohexane, heptane, and octane. In one embodiment, the at least one inert hydrocarbon solvent is hexane.

In some embodiments, any measure that has been commonly used in this field can be used to directly terminate the process for producing the polymer. Suitable terminator includes but not limiting to water or alcohols, such as water, methanol, ethanol, n-propanol, iso-propanol, 2,6-di-tert-butyl hydroquinone/methanol solution, or mixture thereof.

In some embodiments, during the polymerization of isoprene, if needed, a minor amount (e.g. 20 mol % or less, 10 mol % or less, 5 mol % or less, or 1 mol % or less) of at least one co-monomer may be introduced to produce a copolymer of isoprene. For instance, the at least one co-monomer may be chosen from other conjugated dienes such as butadiene. In one embodiment, homo-polymerization of isoprene is conducted.

In some embodiments, the polymerization of isoprene may be conducted at a polymerization temperature ranging from −30° C. to 80° C., such as from 0° C. to 70° C., further such as from 10° C. to 60° C.; and with a polymerization time period ranging from 0.5 hours to 10 hours, such as from 0.5 hours to 2 hours.

In some embodiments, the titanium-based heterogeneous catalyst composition for isoprene polymerization disclosed herein is formed from components comprising:
(A) at least one titanium halide;
(B) at least one organic aluminum compound comprising at least one alkyl aluminum of formula $AlR_3$, wherein each of the three Rs is independently chosen from linear and branched $C_{1-6}$ alkyl groups; and
(C) at least one electron donor comprising at least one tetrahydro-furfuryl ether compound of formula (II),

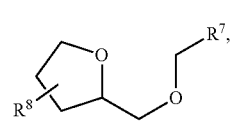

(II)

wherein $R^7$ is chosen from linear and branched $C_{1-10}$ alkyl groups and aryl groups, such as $C_{6-20}$ aryl groups; $R^8$, representing at least one substituent on the tetrahydro-furfuryl moiety is independently chosen from hydrogen and linear and branched $C_{1-4}$ alkyl groups such as chosen from methyl, ethyl, and iso-propyl. In one embodiment, $R^8$ is hydrogen. In another embodiment, when $R^8$ is independently chosen from linear and branched $C_{1-4}$ alkyl groups, wherein $R^8$ exists on 3-, 4- and/or 5-position of the furan ring, and the number of $R^8$ on the furan ring would be ranging from 1 to 3, such as from 1 to 2, and further such as 1.

In some embodiments, the titanium-based heterogeneous catalyst composition disclosed herein may further comprise at least one nonreactive component known in this field, chosen, for instance, from nonreactive components that may provide desirable properties (e.g., ease of handling) to the composition, as long as the introduction or presence of the nonreactive component will not compromise, for example, the performance and the self-support nature (i.e. free form or non-supported state) of the catalyst composition disclosed herein.

In one embodiment, the nonreactive component that may be added to the catalyst may not react chemically with any of the three components (A), (B), and (C) or with the reaction product. In one embodiment, the nonreactive component is chosen from inert solvents, inert diluents, and inert dispersing media.

In some embodiments, the titanium-based heterogeneous catalyst composition disclosed herein is present in a non-supported form or in a free form. Thus, components, such as carriers, supports, or solid catalyst components (for example, silica or magnesium halide) that (1) may affect the self-support nature and/or the micro-structure of the catalyst composition disclosed herein or (2) may convert the catalyst composition disclosed herein into a supported catalyst may be excluded.

In some embodiments, the titanium based heterogeneous catalyst composition for isoprene polymerization disclosed herein is the reaction product of the components (A), (B), and (C). In further some embodiments, the catalyst composition disclosed herein may further comprise at least one inert ingredient chosen, for example, from inert solvents and inert dispersing media. The inert solvent and/or inert dispersing media used herein may be (1) one introduced during the chemical reaction of the three components (A), (B), and (C) for dissolution or dispersion of any of the three components (A), (B), and (C) so as to facilitate the chemical reaction therebetween; or (2) one further added after the completion of the preparation of the catalyst composition so as to disperse the catalyst composition therein, which may facilitate the use of the catalyst composition.

In some embodiments, the at least one inert ingredient may be chosen from saturated aliphatic hydrocarbons, cycloaliphatic hydrocarbons, and aromatic hydrocarbons, for example, chosen from $C_{5-10}$ alkanes and cycloalkanes, such as hexane, cyclohexane, heptane, octane, toluene, and benzene, further such as toluene and hexane.

In some embodiments, the catalyst composition disclosed herein is obtained by reacting the three components (A), (B), and (C) in a chemical reaction, and no other reactant is introduced or involved. However, inert solvents and/or catalysts necessary for the chemical reaction may be included.

In some embodiments, the at least one titanium halide (component (A)) is chosen, for example, from $TiCl_3$ and $TiCl_4$, such as $TiCl_4$, which provides the metal catalytic active center (Ti) for the catalyst composition disclosed herein. In one embodiment, the component (A) or the catalyst composition disclosed herein may contain no metal element (for example V, Co, Cr, Zr, Hf, etc.) other than Ti as the metal catalytic active center of the catalyst composition. In that case, the catalyst composition disclosed herein is a single-metal (or mono-metal) catalytic active center type.

In some embodiments, the at least one organic aluminum compound (component (B)) comprises the at least one alkyl aluminum of a general formula $AlR_3$. In one embodiment, the at least one alkyl aluminum is chosen from tri-methyl aluminum, tri-ethyl aluminum, tri-propyl aluminum, tri-butyl aluminum, tri-pentyl aluminum, and tri-hexyl aluminum. For example, the at least one alkyl aluminum is tri-butyl aluminum, such as tri-isobutyl aluminum. In another embodiment, the at least one organic aluminum compound (the component (B)) may further comprise at least one organic aluminum compound chosen from those commonly used in this field as a co-catalyst component, such as, aluminoxane and haloalkyl aluminum.

In some embodiments, the at least one organic aluminum compound (the component (B)) may comprise only one or two or more types of alkyl aluminum of the formula $AlR_3$.

In some embodiments, the at least one alkyl aluminum of the formula $AlR_3$ is present in the component (B) in an amount of equal to or great than 80 mol %, such as equal to or greater than 90 mol %, further such as equal to greater than 95 mol %, or even further such equal to greater than 98 mol %, also even further such as equal to greater than 99 mol %, relative to the total molar of the component (B). In one embodiment, the component (B) comprises only the at least one alkyl aluminum (i.e., 100 mol %).

In some embodiments, the at least one electron donor (the component (C)) comprises the at least one tetrahydro-furfuryl ether compound of formula (II) and may further comprise at least one additional electron donor other than the at least one tetrahydro-furfuryl ether compound, chosen, for example, from different ether compounds, such as n-butyl ether and diphenyl ether, amines, and esters. In addition, the at least one polyether compound of formula (I) disclosed herein may be further included in the component (C).

In some embodiments, the at least one tetrahydro-furfuryl ether compound of formula (II) is present in the component (C) in an amount of equal to or great than 80 mol %, such as equal to or great than 90 mol %, further such as equal to or great than 95 mol %, even further such as equal to or great than 98 mol %, and also further such as equal to or great than 99 mol %, relative to the total molar of the component (C). In one embodiment, the component (C) comprises only the at least one tetrahydro-furfuryl ether compound (i.e., 100 mol %).

In some embodiments, $R^7$ in the at least one tetrahydro-furfuryl ether compound of formula (II) is chosen from linear and branched $C_{1-4}$ alkyl groups and $C_{6-12}$ aryl groups, and $R^8$ is hydrogen. In some additional embodiments, the at least one tetrahydro-furfuryl ether compound is chosen from methyl tetrahydro-furfuryl ether, ethyl tetrahydro-furfuryl ether, propyl tetrahydro-furfuryl ether, iso-propyl tetrahydro-furfuryl ether, butyl tetrahydro-furfuryl ether, pentyl tetrahydro-furfuryl ether, hexyl tetrahydro-furfuryl ether, heptyl tetrahydro-furfuryl ether, octyl tetrahydro-furfuryl ether, phenyl tetrahydro-furfuryl ether and any combination thereof, with ethyl tetrahydro-furfuryl ether, and butyl tetrahydro-furfuryl ether, such as hexyl tetrahydro-furfuryl ether.

In some embodiments, the tetrahydro-furfuryl ether compound can be used with one kind or as a mixture of two or more kinds.

In some embodiments, the at least one tetrahydro-furfuryl ether compound may be commercially available or may be produced by any process known in this field, for example, according to the process disclosed in the *Journal of American Chemical Society* (1930), 52, pp. 3251-3256, or in the *e-EROS Encyclopedia of Reagents for Organic Synthesis* (2001).

In some embodiments, the ratio between the components in the catalyst composition may vary in a wide range, for example, the molar ratio of the component (B) to the component (A) (B:A) may range from 0.01:1 to 10:1, such as from 0.1:1 to 5:1, further such as from 0.8:1 to 1.2:1; and the molar ratio of the component (C) to the component (B) (C:B) may range from 0.001:1 to 10:1, such as from 0.001:1 to 1:1, further such as from 0.01:1 to 0.1:1. In one embodiment, the molar ratio between the components (A), (B) and (C) (A:B:C) ranges from 1:0.01:0.001 to 1:10:10 (i.e., A:B:C=1: (0.01-10):(0.001-10), such as from 1:0.1:0.001 to 1:5:10 (i.e., A:B:C=1:0.1-5:0.001-1, further such as from 1:0.8:0.01 to 1:1.2:0.1 (i.e., A:B:C=1:(0.8-1.2):(0.01-0.1).)

In some embodiments, the titanium-based heterogeneous catalyst composition disclosed herein is produced by a process comprising:

1) preparing a mixture comprising the components (B) and (C) (for example, by stirring and/or in the presence of at least one organic solvent) under the protection of an inert gas atmosphere (for example, nitrogen gas, a rare gas, and the like), and 2) mixing the mixture with the component (A) for a period of time (if needed, under stirring) to obtain a slurry.

In some embodiments, the process for preparing the titanium-based heterogeneous catalyst composition disclosed herein may optionally comprise a step 3) aging the slurry obtained from the step 2), which may further allow the resultant catalyst composition to sufficiently exhibit its catalyst activities.

In some embodiments, the slurry obtained from the step 2) or the aged slurry obtained from the step 3) may be used directly as the titanium-based heterogeneous catalyst composition for isoprene polymerization. In some other embodiments, the composition obtained by removing any organic solvent and/or any impurities (for example, byproduct or un-reacted reactant) from the slurry or from the aged slurry, and/or the composition obtained by further introducing the nonreactive component as aforesaid into the slurry or into the aged slurry may all be used as the titanium-based heterogeneous catalyst composition for isoprene polymerization disclosed herein.

In some embodiments, the process for preparing the catalyst composition disclosed herein may be conducted in the presence of at least one organic solvent, chosen, for example, from saturated aliphatic hydrocarbons, cycloaliphatic hydrocarbons, and aromatic hydrocarbons, known in this field to have appropriate solubility but no chemical reactivity to the three components (A), (B), and (C). In some embodiments, the at least one organic solvent is chosen, for example, from $C_{5-10}$ alkane and cycloalkane, such as hexane, cyclohexane, heptane, octane, benzene and toluene. In one embodiment, the at least one organic solvent is chosen from toluene and hexane.

When the at least one organic solvent is used, the step 1) may be conducted by, for example, simultaneously contacting the components (B) and (C) in the organic solvent, mixing a solution of the component (B) in the organic solvent with a solution of the component (C) in the organic solvent, mixing the component (B) with a solution of the component (C) in the organic solvent, or mixing a solution of the component (B) in the organic solvent with the component (C), so as to obtain the mixture.

In the step 2), the resultant mixture of step (1) may be mixed (if needed, under stirring) with the component (A) or a solution of the component (A) in the organic solvent (if used), for example, by adding the mixture thereto within a period of time, thereby obtaining the slurry.

In some embodiments, the organic solvents used in each of the steps for dissolving the components (so as to obtain a corresponding solution in the organic solvent) may be identical to or different from one another, and independently of one another, may be chosen from the aforesaid organic solvents. In one embodiment, the same organic solvent may be used for all of the steps.

In some embodiments, there may be limitation on the time duration for which the step a) is conducted, while the step b) may be conducted for a period of time ranging from 10 minutes to 120 minutes, such as from 20 minutes to 60 minutes. In some embodiments, the step a) and the step b) are conducted at a temperature ranging from −70° C. to −10° C., such as from −60° C. to −10° C., further such as from −50° C. to −20° C.

In some embodiments, the process disclosed herein comprises conducting the step (3), (i.e., aging the slurry) at a temperature ranging from −60° C. to 100° C., such as from −30° C. to 30° C., further such as from −30° C. to 0° C. The time period for the aging may range from 0.5 hours to 24 hours, such as from 0.5 hours to 20 hours, further such as from 1 hour to 12 hours.

The titanium-based heterogeneous catalyst composition disclosed herein is suitable for polymerization of isoprene, such as homo-polymerization of isoprene.

In some embodiments, for the polymerization of isoprene, the catalyst composition disclosed herein may be used in an amount varying over a wide range. For example, with respect to isoprene (IP), based on the titanium atom as the metal catalytic active center, the catalyst composition disclosed herein may be used in an amount ranging from $0.1 \times 10^{-4}$ mol Ti/mol IP to $2.5 \times 10^{-4}$ mol Ti/mol IP, such as from $0.5 \times 10^{-4}$ mol Ti/mol IP to $2 \times 10^{-4}$ mol Ti/mol IP.

In some embodiments, the polymerization is conducted by a solution polymerization process in at least one inert hydrocarbon solvent. The at least one inert hydrocarbon solvent may be chosen, for example, from $C_{5-10}$ alkanes and cycloalkanes, for example, hexane, cyclohexane, heptane, and octane, such as hexane.

In some embodiments, any measure that has been commonly used in this field can be used to directly terminate the process of producing the polymer. Suitable terminator includes but not limiting to water or alcohols, for example water, methanol, ethanol, n-propanol, iso-propanol, 2,6-di-tert-butyl hydroquinone/methanol solution and/or mixture thereof.

In some embodiments, during the polymerization of isoprene, if needed, a minor amount (e.g. 20 mol % or less, 10 mol % or less, 5 mol % or less, or 1 mol % or less) of at least one co-monomer may be introduced to produce a copolymer of isoprene. For instance, the at least one co-monomer may be chosen from other conjugated dienes such as butadiene. In one embodiment, homo-polymerization of isoprene is conducted.

In some embodiments, the polymerization of isoprene may be conducted at a polymerization temperature ranging from −30° C. to 80° C., such as from 0° C. to 70° C., further such as from 10° C. to 50° C.; and with a polymerization time period ranging from 0.5 hours to 10 hours, such as from 0.5 hours to 2 hours.

Also provided are processes for polymerization of isoprene, such as homo-polymerization of isoprene, comprising using the titanium-based heterogeneous catalyst composition disclosed herein.

Also provided are processes for polymerization of isoprene, such as homo-polymerization of isoprene, comprising 1) preparing a catalyst composition according to the processes disclosed above, and 2) polymerizing isoprene by using the prepared catalyst composition as at least one part of the catalyst or as the only catalyst involved in the polymerization.

In some embodiments, disclosed is use of the at least one polyether compound of formula (I) and/or the at least one tetrahydro-furfuryl ether compound of formula (II) for the preparation of a catalyst composition for isoprene polymerization (e.g. the specific titanium based heterogeneous catalyst composition for isoprene polymerization disclosed herein). In one embodiment, the at least one polyether compound, or the at least one tetrahydro-furfuryl ether compound is used as the only electron donor during the preparation of the catalyst composition. In another embodiment, any combination of the at least one polyether compound and the at least one tetrahydro-furfuryl ether compound is used as at least one part of the electron donor or the only electron donor, during the preparation of the catalyst composition.

Also disclosed are processes for polymerization of isoprene, such as homo-polymerization of isoprene, comprising 1) using the at least one polyether compound, the at least one tetrahydro-furfuryl ether compound, or any combination thereof as at least one part of the electron donor involved, for example, as the only electron donor involved, during the preparation of the catalyst composition, and 2) polymerizing isoprene by using the prepared catalyst composition as the catalyst for polymerization.

In some embodiments, the processes for polymerization of isoprene comprise: 1) introducing the at least one polyether compound, the at least one tetrahydro-furfuryl ether compound, or any combination thereof as at least one part of the electron donor involved, for instance, as the only electron donor involved, prior to polymerization of isoprene or during polymerization of isoprene. In some embodiments, the at least one polyether compound, the at least one tetrahydro-furfuryl ether compound, or any combination thereof is used in combination with the components (A) and (B) in the same way as hereinbefore described.

The titanium-based heterogeneous catalyst composition disclosed herein may be produced by a simple and easily controllable process.

In some embodiments, when the titanium-based heterogeneous catalyst composition disclosed herein is used for isoprene polymerization, the resultant polyisoprene may have a cis-1,4-structure content of more than 99 mol %, a weight averaged molecular weight ranging from 1,000,000 to 3,000,000, and a molecular weight distribution ranging from 3.0 to 4.0. In addition, the resultant polymer may exhibit a superior abrasion resistance, and may be used for producing tire products in place of at least part of the natural rubbers. The isoprene polymerization process disclosed herein may be stable and easily controllable, which may be suitable for continuous operation.

In some embodiments, when the at least one electron donor comprises the at least one tetrahydro-furfuryl ether compound, less amount of the component (C) is needed as compared to the conventional n-butyl ether or diphenyl ether, but with a higher activity for the resultant catalyst composition.

In some embodiments, when the titanium-based heterogeneous catalyst composition disclosed herein is used for isoprene polymerization, the resultant polyisoprene may have a higher cis-1,4-structure content (e.g., more than 99 mol %), a Mooney viscosity ML(1+4) at 100° C. ranging from 60 to 90, and superior physical and mechanical properties, such as tensile strength of more than 35 MPa and a stress at 300% of more than 14 MPa may be obtained. Thus, the resultant polyisoprene may be used for producing tire products in place of at least part of the natural rubbers.

The present disclosure is further illustrated by the following non-limiting examples.

EXAMPLES

In the context of this specification, unless otherwise expressively specified, all parts and percentages are by weight.
Test
In the examples, the microstructure of the resulting cis-1,4-polyisoprene was determined by the mid-Infrared spectrometer (Bruker Tensor 27, Germany) and the nuclear magnetic resonance spectrometer (Bruker 400 MHZ, Germany), with $CCl_3D$ as the solvent.

The molecular weight and the molecular weight distribution were determined by the LC-10AT model gel permeation chromatography (GPC) by the Shimadzu company at a testing temperature of 25° C., with THF as the mobile phase, and the narrow distributed polystyrene as the standard.

The Mooney viscosity was determined by the SMV-300 model automatic Mooney viscosity meter by the Shimadzu company at a testing temperature of 100° C.

The raw rubber was mixed on an open mill at a roll temperature of 70±5° C. The conditions involved in vulcanization were: a vulcanization temperature of 135° C., a vulcanization duration of 40 minutes, with a base formulation for vulcanization consisting of the raw rubber 100 g, carbon black 35 g, sulfur 2.25 g, the accelerator TBBS 0.7 g, stearic acid 2 g, and zinc oxide 5 g.

The physical and mechanical properties were determined by the AG-20kNG model electronic tensile tester by the Shimadzu company.

Example I-1

Tri-isobutyl aluminum (from the Rubber Plant of the Yanshan Petro-Chemical Industry Corporation) and ethylene glycol dimethyl ether (from Alfa Aesar) were respectively dissolved in hexane to obtain a solution of 0.05 mol/L in each case, kept ready for use. $TiCl_4$ (from the Tianjin Guangfu Chemical Reagent Co., Ltd.) was dissolved in hexane to obtain a solution of 0.05 mol/L, and 5.2 ml of the $TiCl_4$ solution was kept ready for use at a temperature of −60° C. 5.2 ml of the tri-isobutyl aluminum solution and 0.26 ml of the ethylene glycol dimethyl ether solution were mixed together to obtain an ether-aluminum mixture, which was then kept ready for use at a temperature of −60° C. The ether-aluminum mixture was added to the 5.2 ml of $TiCl_4$ solution to obtain a catalyst slurry within a period of 10 minutes. Then, the catalyst slurry was aged at a temperature of −30° C. for 1 hour.

Under the protection of $N_2$ gas, 1490 g hexane and 350 g IP (from the Rubber Plant of the Yanshan Petro-Chemical Industry Corporation) were introduced into a 5 L reactor, and the aged catalyst slurry was further added thereto, resulting in a catalyst amount of $0.5\times10^{-4}$ mol Ti/mol IP and a monomer concentration of 19 wt %. After 3 hours at a temperature of 30° C., the reaction was terminated by a solution of 2,6-di-tert-butyl hydroquinone (from the Shanghai Nuotai Chemical Industry Corporation) in methanol, resulting in a monomer conversion of 53%, a cis-1,4-structure content by molar of 99.5%, a polymer weight averaged molecular weight of 1,157,983, and a molecular weight distribution of 3.5.

Example I-2

Tri-isobutyl aluminum (from the Rubber Plant of the Yanshan Petro-Chemical Industry Corporation) and ethylene glycol dimethyl ether (from Alfa Aesar) were respectively dissolved in hexane to obtain a solution of 0.05 mol/L in each case. $TiCl_4$ (from the Tianjin Guangfu Chemical Reagent Co., Ltd.) was dissolved in hexane to obtain a solution of 0.05 mol/L, and 25.7 ml of the $TiCl_4$ solution was kept ready for use at a temperature of −30° C. 28.3 ml of the tri-isobutyl aluminum solution and 56.6 ml of the ethylene glycol dimethyl ether solution were mixed together to obtain an ether-aluminum mixture, which was then kept ready for use at a temperature of −30° C. The ether-aluminum mixture was added to the 25.7 ml of the $TiCl_4$ solution to obtain a catalyst slurry within a period of 20 minutes. Then, the catalyst slurry was aged at a temperature of −10° C. for 2 hours.

Under the protection of $N_2$ gas, 1700 g hexane and 350 g IP (from the Rubber Plant of the Yanshan Petro-Chemical Industry Corporation) were introduced into a 5 L reactor, and the aged catalyst slurry was further added thereto, resulting in a catalyst amount of $2.5 \times 10^{-4}$ mol Ti/mol IP and a monomer concentration of 17 wt %. After 1 hour at a temperature of 40° C., the reaction was terminated by a solution of 2,6-di-tert-butyl hydroquinone (from the Shanghai Nuotai Chemical Industry Corporation) in methanol, resulting in a monomer conversion of 87%, a cis-1,4-structure content by molar of 99.3%, a polymer weight averaged molecular weight of 2,173,578, and a molecular weight distribution of 3.7.

Example I-3

Tri-isobutyl aluminum (from the Rubber Plant of the Yanshan Petro-Chemical Industry Corporation) and diethylene glycol dimethyl ether (from Alfa Aesar) were respectively dissolved in hexane to obtain a solution of 0.05 mol/L in each case, kept ready for use. TiCl$_4$ (from the Tianjin Guangfu Chemical Reagent Co., Ltd.) was dissolved in hexane to obtain a solution of 0.05 mol/L, and 10.3 ml of the TiCl$_4$ solution was kept ready for use at a temperature of −40° C. 9.3 ml of the tri-isobutyl aluminum solution and 1 ml of the diethylene glycol dimethyl ether solution were mixed together to obtain an ether-aluminum mixture, which was then kept ready for use at a temperature of −40° C. The ether-aluminum mixture was added to the 10.3 ml of the TiCl$_4$ solution to obtain a catalyst slurry within a period of 30 minutes. Then, the catalyst slurry was aged at a temperature of 10° C. for 20 minutes.

Under the protection of N$_2$ gas, 1700 g hexane and 350 g IP (from the Rubber Plant of the Yanshan Petro-Chemical Industry Corporation) were introduced into a 5 L reactor, and the aged catalyst slurry was further added thereto, resulting in a catalyst amount of $1.0 \times 10^{-4}$ mol Ti/mol IP and a monomer concentration of 17 wt %. After 1 hour at a temperature of 50° C., the reaction was terminated by a solution of 2,6-di-tert-butyl hydroquinone (from the Shanghai Nuotai Chemical Industry Corporation) in methanol, resulting in a monomer conversion of 83%, a cis-1,4-structure content by molar of 99.2%, a polymer weight averaged molecular weight of 2,345,819, and a molecular weight distribution of 3.4.

Example I-4

Tri-isobutyl aluminum (from the Rubber Plant of the Yanshan Petro-Chemical Industry Corporation) and diethylene glycol dimethyl ether (from Alfa Aesar) were respectively dissolved in hexane to obtain a solution of 0.05 mol/L in each case, kept ready for use. TiCl$_4$ (from the Tianjin Guangfu Chemical Reagent Co., Ltd.) was dissolved in hexane to obtain a solution of 0.05 mol/L, and 2.1 ml of the TiCl$_4$ solution was kept ready for use at a temperature of −20° C. 2.5 ml of the tri-isobutyl aluminum solution and 0.7 ml of the diethylene glycol dimethyl ether solution were mixed together to obtain an ether-aluminum mixture, which was then kept ready for use at a temperature of −20° C. The ether-aluminum mixture was added to the 2.1 ml of the TiCl$_4$ solution to obtain a catalyst slurry within a period of 30 minutes. Then, the catalyst slurry was aged at a temperature of 30° C. for 30 minutes.

Under the protection of N$_2$ gas, 1700 g hexane and 350 g IP (from the Rubber Plant of the Yanshan Petro-Chemical Industry Corporation) were introduced into a 5 L reactor, and the aged catalyst slurry was further added thereto, resulting in a catalyst amount of $0.2 \times 10^{-4}$ mol Ti/mol IP and a monomer concentration of 17 wt %. After 3 hours at a temperature of 60° C., the reaction was terminated by a solution of 2,6-di-tert-butyl hydroquinone (from the Shanghai Nuotai Chemical Industry Corporation) in methanol, resulting in a monomer conversion of 45%, a cis-1,4-structure content by molar of 99.0%, a polymer weight averaged molecular weight of 1,326,947, and a molecular weight distribution of 3.3.

Example I-5

Tri-isobutyl aluminum (from the Rubber Plant of the Yanshan Petro-Chemical Industry Corporation) and triethylene glycol dimethyl ether (from Alfa Aesar) were respectively dissolved in hexane to obtain a solution of 0.05 mol/L in each case, kept ready for use. TiCl$_4$ (from the Tianjin Guangfu Chemical Reagent Co., Ltd.) was dissolved in hexane to obtain a solution of 0.05 mol/L, 20.6 ml of the TiCl$_4$ solution was kept ready for use at a temperature of −70° C. 20.6 ml of the tri-isobutyl aluminum solution and 0.2 ml of the triethylene glycol dimethyl ether solution were mixed together to obtain an ether-aluminum mixture, which was then kept ready for use at a temperature of −70° C. The ether-aluminum mixture was added to the 20.6 ml of the TiCl$_4$ solution to obtain a catalyst slurry within a period of 20 minutes. Then, the catalyst slurry was aged at a temperature of −60° C. for 24 hours.

Under the protection of N$_2$ gas, 1980 g hexane and 350 g IP (from the Rubber Plant of the Yanshan Petro-Chemical Industry Corporation) were introduced into a 5 L reactor, and the aged catalyst slurry was further added thereto, resulting in a catalyst amount of $2.0 \times 10^{-4}$ mol Ti/mol IP and a monomer concentration of 15 wt %. After 1 hour at a temperature of 20° C., the reaction was terminated by a solution of 2,6-di-tert-butyl hydroquinone (from the Shanghai Nuotai Chemical Industry Corporation) in methanol, resulting in a monomer conversion of 89%, a cis-1,4-structure content by molar of 99.3%, a polymer weight averaged molecular weight of 1,805,293, and a molecular weight distribution of 3.6.

Example I-6

Tri-isobutyl aluminum (from the Rubber Plant of the Yanshan Petro-Chemical Industry Corporation) and tetraethylene glycol dimethyl ether (from Alfa Aesar) were respectively dissolved in hexane to obtain a solution of 0.05 mol/L in each case, kept ready for use. TiCl$_4$ (from the Tianjin Guangfu Chemical Reagent Co., Ltd.) was dissolved in hexane to obtain a solution of 0.05 mol/L, and 10.3 ml of the TiCl$_4$ solution was kept ready for use at a temperature of −50° C. 10.3 ml of the tri-isobutyl aluminum solution and 1 ml of the tetraethylene glycol dimethyl ether solution were mixed together to obtain an ether-aluminum mixture, which was then kept ready for use at a temperature of −50° C. The ether-aluminum mixture was added to the 10.3 ml of the TiCl$_4$ solution to obtain a catalyst slurry within a period of 20 minutes. Then, the catalyst slurry was aged at a temperature of −30° C. for 5 hours.

Under the protection of N$_2$ gas, 2340 g hexane and 350 g IP (from the Rubber Plant of the Yanshan Petro-Chemical Industry Corporation) were introduced into a 5 L reactor, and the aged catalyst slurry was further added thereto, resulting in a catalyst amount of $1.0 \times 10^{-4}$ mol Ti/mol IP and a monomer concentration of 13 wt %. After 1 hour at a temperature of 0° C., the reaction was terminated by a solution of 2,6-di-tert-butyl hydroquinone (from the Shanghai Nuotai Chemical Industry Corporation) in methanol, resulting in a monomer conversion of 62%, a cis-1,4-structure content by molar of 99.2%, a polymer weight averaged molecular weight of 1,473,285, and a molecular weight distribution of 3.4.

Example II-1

Tri-isobutyl aluminum (from the Rubber Plant of the Yanshan Petro-Chemical Industry Corporation) was dissolved in hexane to obtain a solution of 0.05 mol/L, and ethyl tetrahydro-furfuryl ether (from the Rubber Plant of the Yanshan Petro-Chemical Industry Corporation) was dissolved in hexane to obtain a solution of 0.005 mol/L, and both were kept ready for use. $TiCl_4$ (from the Tianjin Guangfu Chemical Reagent Co., Ltd.) was dissolved in hexane to obtain a solution of 0.05 mol/L, and 5.2 ml of the $TiCl_4$ solution was kept ready for use at a temperature of −60° C. 5.2 ml of the tri-isobutyl aluminum solution and 0.5 ml of the ethyl tetrahydro-furfuryl ether solution were mixed together to obtain an ether-aluminum mixture, which was then kept ready for use at a temperature of −60° C. The ether-aluminum mixture was added to the 5.2 ml of the $TiCl_4$ solution to obtain a catalyst slurry within a period of 20 minutes. Then, the catalyst slurry was aged at a temperature of −30° C. for 1 hour.

Under the protection of $N_2$ gas, 1700 g hexane and 350 g IP (from the Rubber Plant of the Yanshan Petro-Chemical Industry Corporation) were introduced into a 5 L reactor, and the aged catalyst slurry was further added thereto, resulting in a catalyst amount of $0.5 \times 10^{-4}$ mol Ti/mol IP and a monomer concentration of 17 wt %. After 4 hours at a temperature of 30° C., the reaction was terminated by a solution of 2,6-di-tert-butyl hydroquinone (from the Shanghai Nuotai Chemical Industry Corporation) in methanol, resulting in a monomer conversion of 67%, a cis-1,4-structure content by molar of 99.2%, a polymer weight averaged molecular weight of 2,174,953, a molecular weight distribution of 3.5, and a raw rubber Mooney viscosity ML(1+4) at 100° C. of 91.

The polymer was vulcanized in accordance with the aforesaid base formulation for vulcanization to obtain a vulcanized rubber having a tensile strength of 36.1 MPa and a stress at 300% of 15.7 MPa.

Example II-2

Tri-isobutyl aluminum (from the Rubber Plant of the Yanshan Petro-Chemical Industry Corporation) was dissolved in hexane to obtain a solution of 0.05 mol/L, and ethyl tetrahydro-furfuryl ether (from the Rubber Plant of the Yanshan Petro-Chemical Industry Corporation) was dissolved in hexane to obtain a solution of 0.005 mol/L, and both were kept ready for use. $TiCl_4$ (from the Tianjin Guangfu Chemical Reagent Co., Ltd.) was dissolved in hexane to obtain a solution of 0.05 mol/L, and 2.1 ml of the $TiCl_4$ solution was kept ready for use at a temperature of −20° C. 2.5 ml of the tri-isobutyl aluminum solution and 0.75 ml of the ethyl tetrahydro-furfuryl ether solution were mixed together to obtain an ether-aluminum mixture, which was then kept ready for use at a temperature of −20° C. The ether-aluminum mixture was added to the 2.1 ml of the $TiCl_4$ solution to obtain a catalyst slurry within a period of 30 minutes. Then, the catalyst slurry was aged at a temperature of 30° C. for 30 minutes.

Under the protection of $N_2$ gas, 1700 g hexane and 350 g IP (from the Rubber Plant of the Yanshan Petro-Chemical Industry Corporation) were introduced into a 5 L reactor, and the aged catalyst slurry was further added thereto, resulting in a catalyst amount of $0.2 \times 10^{-4}$ mol Ti/mol IP and a monomer concentration of 17 wt %. After 3 hours at a temperature of 60° C., the reaction was terminated by a solution of 2,6-di-tert-butyl hydroquinone (from the Shanghai Nuotai Chemical Industry Corporation) in methanol, resulting in a monomer conversion of 54%, a cis-1,4-structure content by molar of 99.0%, a polymer weight averaged molecular weight of 1,854,376, a molecular weight distribution of 3.6, and a raw rubber Mooney viscosity ML(1+4) at 100° C. of 84.

The polymer was vulcanized in accordance with the aforesaid base formulation for vulcanization to obtain a vulcanized rubber having a tensile strength of 35.8 MPa and a stress at 300% of 15.3 MPa.

Example II-3

Tri-isobutyl aluminum (from the Rubber Plant of the Yanshan Petro-Chemical Industry Corporation) was dissolved in hexane to obtain a solution of 0.05 mol/L, and ethyl tetrahydro-furfuryl ether (from the Rubber Plant of the Yanshan Petro-Chemical Industry Corporation) was dissolved in hexane to obtain a solution of 0.005 mol/L, and both were kept ready for use. $TiCl_4$ (from the Tianjin Guangfu Chemical Reagent Co., Ltd.) was dissolved in hexane to obtain a solution of 0.05 mol/L, and 10.3 ml of the $TiCl_4$ solution was kept ready for use at a temperature of −40° C. 9.3 ml of the tri-isobutyl aluminum solution and 4.7 ml of the ethyl tetrahydro-furfuryl ether solution were mixed together to obtain an ether-aluminum mixture, which was then kept ready for use at a temperature of −40° C. The ether-aluminum mixture was added to the 10.3 ml of the $TiCl_4$ solution to obtain a catalyst slurry within a period of 30 minutes. Then, the catalyst slurry was aged at a temperature of 10° C. for 20 minutes.

Under the protection of $N_2$ gas, 1700 g hexane and 350 g IP (from the Rubber Plant of the Yanshan Petro-Chemical Industry Corporation) were introduced into a 5 L reactor, and the aged catalyst slurry was further added thereto, resulting in a catalyst amount of $1 \times 10^{-4}$ mol Ti/mol IP and a monomer concentration of 17 wt %. After 2 hours at a temperature of 20° C., the reaction was terminated by a solution of 2,6-di-tert-butyl hydroquinone (from the Shanghai Nuotai Chemical Industry Corporation) in methanol, resulting in a monomer conversion of 91%, a cis-1,4-structure content by molar of 99.2%, a polymer weight averaged molecular weight of 1,835,492, a molecular weight distribution of 3.8, and a raw rubber Mooney viscosity ML(1+4) at 100° C. of 80.

The polymer was vulcanized in accordance with the aforesaid base formulation for vulcanization to obtain a vulcanized rubber having a tensile strength of 35.7 MPa and a stress at 300% of 15.4 MPa.

Example II-4

Tri-isobutyl aluminum (from the Rubber Plant of the Yanshan Petro-Chemical Industry Corporation) was dissolved in hexane to obtain a solution of 0.05 mol/L, and isopropyl tetrahydro-furfuryl ether (from the Rubber Plant of the Yanshan Petro-Chemical Industry Corporation) was dissolved in hexane to obtain a solution of 0.005 mol/L, and both were kept ready for use. $TiCl_4$ (from the Tianjin Guangfu Chemical Reagent Co., Ltd.) was dissolved in hexane to obtain a solution of 0.05 mol/L, and 25.7 ml of the $TiCl_4$ solution was kept ready for use at a temperature of −30° C. 28.3 ml of the tri-isobutyl aluminum solution and 28.3 ml of the isopropyl tetrahydro-furfuryl ether solution were mixed together to obtain an ether-aluminum mixture, which was then kept ready for use at a temperature of −30° C. The ether-aluminum mixture was added to the 25.7 ml of the $TiCl_4$ solution to obtain a catalyst slurry within a period of 20 minutes. Then, the catalyst slurry was aged at a temperature of −10° C. for 2 hours.

Under the protection of $N_2$ gas, 1700 g hexane and 350 g IP (from the Rubber Plant of the Yanshan Petro-Chemical Industry Corporation) were introduced into a 5 L reactor, and the aged catalyst slurry was further added thereto, resulting in a catalyst amount of $2.5 \times 10^{-4}$ mol Ti/mol IP and a monomer concentration of 17 wt %. After 1 hour at a temperature of 50° C., the reaction was terminated by a solution of 2,6-di-tert-butyl hydroquinone (from the Shanghai Nuotai Chemical Industry Corporation) in methanol, resulting in a monomer conversion of 87%, a cis-1,4-structure content by molar of 99.1%, a polymer weight averaged molecular weight of 1,531,748, a molecular weight distribution of 3.7, and a raw rubber Mooney viscosity ML(1+4) at 100° C. of 65.

The polymer was vulcanized in accordance with the aforesaid base formulation for vulcanization to obtain a vulcanized rubber having a tensile strength of 34.9 MPa and a stress at 300% of 14.8 MPa.

Example II-5

Tri-isobutyl aluminum (from the Rubber Plant of the Yanshan Petro-Chemical Industry Corporation) and n-butyl tetrahydro-furfuryl ether (from the Rubber Plant of the Yanshan Petro-Chemical Industry Corporation) were respectively dissolved in hexane to obtain a solution of 0.05 mol/L in each case, kept ready for use. $TiCl_4$ (from the Tianjin Guangfu Chemical Reagent Co., Ltd.) was dissolved in hexane to obtain a solution of 0.05 mol/L, and 15.4 ml of the $TiCl_4$ solution was kept ready for use at a temperature of −70° C. 12.3 ml of the tri-isobutyl aluminum solution and 9.8 ml of the n-butyl tetrahydro-furfuryl ether solution were mixed together to obtain an ether-aluminum mixture, which was then kept ready for use at a temperature of −70° C. The ether-aluminum mixture was added to the 15.4 ml of the $TiCl_4$ solution to obtain a catalyst slurry within a period of 20 minutes. Then, the catalyst slurry was aged at a temperature of −60° C. for 24 hours.

Under the protection of $N_2$ gas, 1980 g hexane and 350 g IP (from the Rubber Plant of the Yanshan Petro-Chemical Industry Corporation) were introduced into a 5 L reactor, and the aged catalyst slurry was further added thereto, resulting in a catalyst amount of $1.5\times10^{-4}$ mol Ti/mol IP and a monomer concentration of 15 wt %. After 2 hours at a temperature of 0° C., the reaction was terminated by a solution of 2,6-di-tert-butyl hydroquinone (from the Shanghai Nuotai Chemical Industry Corporation) in methanol, resulting in a monomer conversion of 83%, a cis-1,4-structure content by molar of 99.3%, a polymer weight averaged molecular weight of 1,756,344, a molecular weight distribution of 3.5, and a raw rubber Mooney viscosity ML(1+4) at 100° C. of 76.

The polymer was vulcanized in accordance with the aforesaid base formulation for vulcanization to obtain a vulcanized rubber having a tensile strength of 35.4 MPa and a stress at 300% of 15.1 MPa.

Example II-6

Tri-isobutyl aluminum (from the Rubber Plant of the Yanshan Petro-Chemical Industry Corporation) and n-hexyl tetrahydro-furfuryl ether (from the Rubber Plant of the Yanshan Petro-Chemical Industry Corporation) were respectively dissolved in hexane to obtain a solution of 0.05 mol/L in each case, kept ready for use. $TiCl_4$ (from the Tianjin Guangfu Chemical Reagent Co., Ltd.) was dissolved in hexane to obtain a solution of 0.05 mol/L, and 10.3 ml of the $TiCl_4$ solution was kept ready for use at a temperature of −50° C. 10.3 ml of the tri-isobutyl aluminum solution and 1 ml of the n-hexyl tetrahydro-furfuryl ether solution were mixed together to obtain an ether-aluminum mixture, which was then kept ready for use at a temperature of −50° C. The ether-aluminum mixture was added to the 10.3 ml of the $TiCl_4$ solution to obtain a catalyst slurry within a period of 20 minutes. Then, the catalyst slurry was aged at a temperature of −30° C. for 5 hours.

Under the protection of $N_2$ gas, 2340 g hexane and 350 g IP (from the Rubber Plant of the Yanshan Petro-Chemical Industry Corporation) were introduced into a 5 L reactor, and the aged catalyst slurry was further added thereto, resulting in a catalyst amount of $2.0\times10^{-4}$ mol Ti/mol IP and a monomer concentration of 13 wt %. After 2 hours at a temperature of −10° C., the reaction was terminated by a solution of 2,6-di-tert-butyl hydroquinone (from the Shanghai Nuotai Chemical Industry Corporation) in methanol, resulting in a monomer conversion of 67%, a cis-1,4-structure content by molar of 99.3%, a polymer weight averaged molecular weight of 1,694,287, a molecular weight distribution of 3.6, and a raw rubber Mooney viscosity ML(1+4) at 100° C. of 72.

The polymer was vulcanized in accordance with the aforesaid base formulation for vulcanization to obtain a vulcanized rubber having a tensile strength of 35.2 MPa and a stress at 300% of 14.9 MPa.

Example II-7

Tri-isobutyl aluminum (from the Rubber Plant of the Yanshan Petro-Chemical Industry Corporation) and phenyl tetrahydro-furfuryl ether (from the Rubber Plant of the Yanshan Petro-Chemical Industry Corporation) were respectively dissolved in hexane to obtain a solution of 0.05 mol/L in each case, kept ready for use. $TiCl_4$ (from the Tianjin Guangfu Chemical Reagent Co., Ltd.) was dissolved in hexane to obtain a solution of 0.05 mol/L, and 10.3 ml of the $TiCl_4$ solution was kept ready for use at a temperature of −50° C. 10.3 ml of the tri-isobutyl aluminum solution and 1.5 ml of the phenyl tetrahydro-furfuryl ether solution were mixed together to obtain an ether-aluminum mixture, which was then kept ready for use at a temperature of −50° C. The ether-aluminum mixture was added to the 10.3 ml of the $TiCl_4$ solution to obtain a catalyst slurry within a period of 20 minutes. Then, the catalyst slurry was aged at a temperature of −30° C. for 5 hours.

Under the protection of $N_2$ gas, 2340 g hexane and 350 g IP (from the Rubber Plant of the Yanshan Petro-Chemical Industry Corporation) were introduced into a 5 L reactor, and the aged catalyst slurry was further added thereto, resulting in a catalyst amount of $2.5\times10^{-4}$ mol Ti/mol IP and a monomer concentration of 13 wt %. After 2 hours at a temperature of 0° C., the reaction was terminated by a solution of 2,6-di-tert-butyl hydroquinone (from the Shanghai Nuotai Chemical Industry Corporation) in methanol, resulting in a monomer conversion of 71%, a cis-1,4-structure content by molar of 99.1%, a polymer weight averaged molecular weight of 1,678,354, a molecular weight distribution of 3.6, and a raw rubber Mooney viscosity ML(1+4) at 100° C. of 70.

The polymer was vulcanized in accordance with the aforesaid base formulation for vulcanization to obtain a vulcanized rubber having a tensile strength of 35.1 MPa and a stress at 300% of 14.7 MPa.

Example II-8

Tri-isobutyl aluminum (from the Rubber Plant of the Yanshan Petro-Chemical Industry Corporation) and 2-(ethoxymethyl)-5-methyl tetrahydrofuran (from the Rubber Plant of the Yanshan Petro-Chemical Industry Corporation) were respectively dissolved in hexane to obtain a solution of 0.05 mol/L in each case, kept ready for use. $TiCl_4$ (from the Tianjin Guangfu Chemical Reagent Co., Ltd.) was dissolved in hexane to obtain a solution of 0.05 mol/L, 10.3 ml of the TiCl$_4$ solution was kept ready for use at a temperature of −50° C. 10.3 ml of the tri-isobutyl aluminum solution and 2.5 ml of the 2-(ethoxymethyl)-5-methyl tetrahydrofuran solution were mixed together to obtain an ether-aluminum mixture, which was then kept ready for use at a temperature of −50° C. The ether-aluminum mixture was added to the 10.3 ml of the TiCl$_4$ solution to obtain a catalyst slurry within a period of 20 minutes. Then, the catalyst slurry was aged at a temperature of −30° C. for 5 hours.

Under the protection of N$_2$ gas, 2340 g hexane and 350 g IP (from the Rubber Plant of the Yanshan Petro-Chemical Industry Corporation) were introduced into a 5 L reactor, and the aged catalyst slurry was further added thereto, resulting in a catalyst amount of $2.0 \times 10^{-4}$ mol Ti/mol IP and a monomer concentration of 13 wt %. After 2 hours at a temperature of 10° C., the reaction was terminated by a solution of 2,6-di-tert-butyl hydroquinone (from the Shanghai Nuotai Chemical Industry Corporation) in methanol, resulting in a monomer conversion of 76%, a cis-1,4-structure content by molar of 99.2%, a polymer weight averaged molecular weight of 1,758,462, a molecular weight distribution of 3.7, and a raw rubber Mooney viscosity ML(1+4) at 100° C. of 74.

The polymer was vulcanized in accordance with the aforesaid base formulation for vulcanization to obtain a vulcanized rubber having a tensile strength of 35.3 MPa and a stress at 300% of 14.9 MPa.

Example II-9

Tri-isobutyl aluminum (from the Rubber Plant of the Yanshan Petro-Chemical Industry Corporation) and 2-(ethoxymethyl)-5-isopropyl tetrahydrofuran (from the Rubber Plant of the Yanshan Petro-Chemical Industry Corporation) were respectively dissolved in hexane to obtain a solution of 0.05 mol/L in each case, kept ready for use. TiCl$_4$ (from the Tianjin Guangfu Chemical Reagent Co., Ltd.) was dissolved in hexane to obtain a solution of 0.05 mol/L, 15.4 ml of the TiCl$_4$ solution was kept ready for use at a temperature of −60° C. 12.3 ml of the tri-isobutyl aluminum solution and 9.8 ml of the 2-(ethoxymethyl)-5-isopropyl tetrahydrofuran solution were mixed together to obtain an ether-aluminum mixture, which was then kept ready for use at a temperature of −70° C. The ether-aluminum mixture was added to the 15.4 ml of the TiCl$_4$ solution to obtain a catalyst slurry within a period of 20 minutes. Then, the catalyst slurry was aged at a temperature of −50° C. for 24 hours.

Under the protection of N$_2$ gas, 1980 g hexane and 350 g IP (from the Rubber Plant of the Yanshan Petro-Chemical Industry Corporation) were introduced into a 5 L reactor, and the aged catalyst slurry was further added thereto, resulting in a catalyst amount of $1.5 \times 10^{-4}$ mol Ti/mol IP and a monomer concentration of 15 wt %. After 2 hours at a temperature of −10° C., the reaction was terminated by a solution of 2,6-di-tert-butyl hydroquinone (from the Shanghai Nuotai Chemical Industry Corporation) in methanol, resulting in a monomer conversion of 71%, a cis-1,4-structure content by molar of 99.1%, a polymer weight averaged molecular weight of 1,815,344, a molecular weight distribution of 3.6, and a raw rubber Mooney viscosity ML(1+4) at 100° C. of 77.

The polymer was vulcanized in accordance with the aforesaid base formulation for vulcanization to obtain a vulcanized rubber having a tensile strength of 35.5 MPa and a stress at 300% of 15.0 MPa.

It will be apparent to those skilled in the art that various modifications and variation can be made in the present disclosure without departing from the spirit or scope of the invention. Thus, it is intended that the present disclosure covers the modifications and variations of this disclosure provided they come within the scope of the appended claims and their equivalents.

What is claimed is:

1. A catalyst composition for preparing cis-1,4 polyisoprene formed from components consisting essentially of:
   (A) at least one titanium halide;
   (B) at least one organic aluminum compound comprising at least one alkyl aluminum of formula AlR$_3$, wherein each of the three Rs is independently chosen from linear and branched C$_{1-6}$ alkyl groups; and
   (C) at least one electron donor comprising at least one polyether compound of formula (I) and/or at least one tetrahydro-furfuryl ether compound of formula (II), $$R^0O(R^1O)_pR^2 \quad (I),$$

wherein R$^0$ and R$^2$ are independently chosen from linear and branched C$_{1-6}$ alkyl groups; R$^1$ is —(CR$^3$R$^4$—CR$^5$R$^6$)—, wherein R$^3$, R$^4$, R$^5$, and R$^6$ are independently chosen from hydrogen and linear and branched C$_{1-4}$ alkyl groups, and p is an integer ranging from 1 to 6,

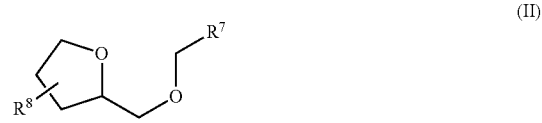

(II)

wherein R$^7$ is chosen from linear and branched C$_{1-10}$ alkyl groups and aryl groups; R$^8$, representing at least one substituent on the tetrahydro-furfuryl moiety, is independently chosen from hydrogen and linear and branched C$_{1-4}$ alkyl groups.

2. The catalyst composition according to claim 1, wherein the at least one titanium halide is TiCl4.

3. The catalyst composition according to claim 1, wherein the at least one organic aluminum compound is the at least one alkyl aluminum of the formula AlR$_3$.

4. The catalyst composition according to claim 1, wherein the at least one alkylaluminum of the formula AlR$_3$ is chosen from tri-methyl aluminum, tri-ethyl aluminum, tri-propyl aluminum, tri-butyl aluminum, tri-pentyl aluminum, and tri-hexyl aluminum.

5. The catalyst composition according to claim 1, wherein the at least one electron donor is the at least one polyether compound of the formula (I) and/or the at least one tetrahydro-furfuryl ether compound of the formula (II), 6. The catalyst composition according to claim 1, wherein the at least one tetrahydro-furfuryl ether compound of formula (II) is chosen from methyl tetrahydro-furfuryl ether, ethyl tetrahydro-furfuryl ether, n-propyl tetrahydro-furfuryl ether, iso-propyl tetrahydro-furfuryl ether, butyl tetrahydro-furfuryl ether, pentyl tetrahydro-furfuryl ether, hexyl tetrahydro-furfuryl ether, heptyl tetrahydro-furfuryl ether, octyl tetrahydro-furfuryl ether, and phenyl tetrahydro-furfuryl ether; and the at least one polyether compound of formula (I) is chosen from ethylene glycol dimethyl ether, diethylene glycol dimethyl ether, triethylene glycol dimethyl ether, tetraethylene, and glycol dimethyl ether.

7. The catalyst composition according to claim 1, wherein the molar ratio of the at least one organic aluminum compound to the at least one titanium halide ranges from 0.01:1 to 10:1, and the molar ratio of the at least one electron donor to the at least one organic aluminum compound ranges from 0.001:1 to 10:1.

8. The catalyst composition according to claim 1, which is a reaction product of the components (A), (B), and (C).

9. A process for producing a catalyst composition for isoprene polymerization comprising:
1) preparing a mixture comprising at least one organic aluminum compound (B) and at least one electron donor (C) under an inert gas atmosphere,
2) mixing the mixture with at least one titanium halide (A) to obtain a slurry, and
3) optionally ageing the slurry; wherein:
the process does not comprise a step of adding a support,
the at least one organic aluminum compound (B) comprises at least one alkyl aluminum of formula $AlR_3$, wherein each of the three Rs is independently chosen from linear and branched $C_{1-6}$ alkyl groups; and
the at least one electron donor (C) comprises at least one polyether compound of formula (I) and/or at least one tetrahydro-furfuryl ether compound of formula (II), $$R^0O(R^1O)_pR^2 \qquad (I),$$

wherein $R^0$ and $R^2$ are independently chosen from linear and branched $C_{1-6}$ alkyl groups; $R^1$ is —$(CR^3R^4—CR^5R^6)$—, wherein $R^3$, $R^4$, $R^5$ and $R^6$ are independently chosen from hydrogen and linear and branched $C_{1-4}$ alkyl groups, and p is chosen from integers ranging from 1 to 6,

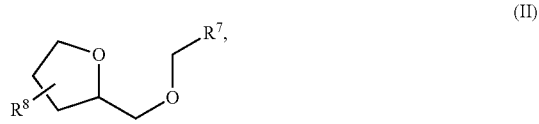

wherein $R^7$ are chosen from linear and branched C1-10 alkyl groups and aryl groups, $R^8$, representing at least one substituent on the tetrahydro-furfuryl moiety, is independently chosen from hydrogen and linear and branched $C_{1-4}$ alkyl groups.

10. The process according to claim 9, wherein the step 1) and the step 2) are conducted at a temperature ranging from −70° C. to −10° C., and the step 3) is conducted at a temperature ranging from −60° C. to 100° C.

11. The process according to claim 9, wherein the step 2) is conducted for a time period ranging from 20 minutes to 60 minutes, and the step 3) is conducted for a time period ranging from 0.5 hours to 24 hours.

12. A process for preparing cis-1,4 polyisoprene, comprising reacting isoprene with a catalyst composition formed from components comprising:
(A) at least one titanium halide;
(B) at least one organic aluminum compound comprising at least one alkyl aluminum of formula $AlR_3$, wherein each of the three Rs is independently chosen from linear and branched $C_{1-6}$ alkyl groups; and
(C) at least one electron donor comprising at least one polyether compound of formula (I) and/or at least one tetrahydro-furfuryl ether compound of formula (II), $$R^0O(R^1O)_pR^2 \qquad (I),$$

wherein $R^0$ and, $R^2$ are independently chosen from linear and branched $C_{1-6}$ alkyl groups; $R^1$ is —$(CR^3R^4—CR^5R^6)$—, wherein $R^3$, $R^4$, $R^5$, and $R^6$ are independently chosen from hydrogen and linear and branched $C_{1-4}$ alkyl groups, and p is an integer ranging from 1 to 6,

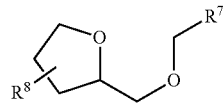

wherein $R^7$ is chosen from linear and branched $C_{1-10}$ alkyl and aryl groups; $R^8$, representing at least one substituent on the tetrahydro-furfuryl moiety, is independently chosen from hydrogen and linear and branched $C_{1-4}$ alkyl groups, and further wherein the catalyst composition does not comprise magnesium halide.

13. A process for polymerizing isoprene, comprising:
preparing a catalyst composition according to the process of claim 9; and
contacting the catalyst composition with isoprene.

14. The process according to claim 9, wherein the at least one tetrahydro-furfuryl ether compound is chosen from methyl tetrahydro-furfuryl ether, ethyl tetra hydro-furfuryl ether, n-propyl tetrahydro-furfuryl ether, iso-propyl tetrahydro-furfuryl ether, butyl tetrahydro-furfuryl ether, pentyl tetrahydro-furfuryl ether, hexyl tetrahydro-furfuryl ether, heptyl tetrahydro-furfuryl ether, octyl tetrahydro-furfuryl ether, and phenyl tetrahydro-furfuryl ether; and the at least one polyether compound is chosen from ethylene glycol dimethyl ether, diethylene glycol dimethyl ether, triethylene glycol dimethyl ether, and tetraethylene glycol dimethyl ether.

15. The process according to claim 12, wherein the at least one tetrahydro-furfuryl ether compound is chosen from methyl tetrahydro-furfuryl ether, ethyl tetrahydro-furfuryl ether, n-propyl tetrahydro-furfuryl ether, iso-propyl tetrahydro-furfuryl ether, butyl tetrahydro-furfuryl ether, pentyl tetrahydro-furfuryl ether, hexyl tetrahydro-furfuryl ether, heptyl tetrahydro-furfuryl ether, octyl tetrahydro-furfuryl ether, and phenyl tetrahydro-furfuryl ether; and the at least one polyether compound is chosen from ethylene glycol dimethyl ether, diethylene glycol dimethyl ether, triethylene glycol dimethyl ether, and tetraethylene glycol dimethyl ether.

16. A catalyst composition for preparing cis-1,4 polyisoprene formed from components comprising:
(A) at least one titanium halide;
(B) at least one organic aluminum compound comprising at least one alkyl aluminum of formula $AlR_3$, wherein each of the three Rs is independently chosen from linear and branched $C_{1-6}$ alkyl groups; and
(C) at least one electron donor comprising at least one polyether compound of formula (I) and/or at least one tetrahydro-furfuryl ether compound of formula (II), $$R^0O(R^1O)_pR^2 \qquad (I),$$

wherein $R^0$ and $R^2$ are independently chosen from linear and branched $C_{1-6}$ alkyl groups; $R^1$ is —$(CR^3R^4—CR^5R^6)$—, wherein $R^3$, $R^4$, $R^5$, and $R^6$ are independently chosen from hydrogen and linear and branched $C_{1-4}$ alkyl groups, and p is an integer ranging from 1 to 6,

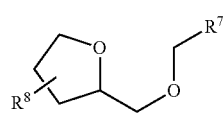

wherein $R^7$ is chosen from linear and branched $C_{1-10}$ alkyl groups and aryl groups; $R^8$, representing at least one substituent on the tetrahydro-furfuryl moiety, is independently chosen from hydrogen and linear and branched $C_{1-4}$ alkyl groups; and further wherein the catalyst composition does not comprise a support.

* * * * *

UNITED STATES PATENT AND TRADEMARK OFFICE
CERTIFICATE OF CORRECTION

PATENT NO.        : 8,604,143 B2
APPLICATION NO.   : 13/284744
DATED             : December 10, 2013
INVENTOR(S)       : Chao Wang et al.

It is certified that error appears in the above-identified patent and that said Letters Patent is hereby corrected as shown below:

In the Claims

Claim 2, col. 24, line 37, "TiCl4" should read --$TiCl_4$--.

Claim 5, col. 24, line 49, "formula (II)," should read --formula (II).--.

Signed and Sealed this
Fifth Day of August, 2014

Michelle K. Lee
*Deputy Director of the United States Patent and Trademark Office*